US010800043B2

United States Patent
Park et al.

(10) Patent No.: US 10,800,043 B2
(45) Date of Patent: Oct. 13, 2020

(54) INTERACTION APPARATUS AND METHOD FOR DETERMINING A TURN-TAKING BEHAVIOR USING MULTIMODEL INFORMATION

(71) Applicant: ELECTRONICS AND TELECOMMUNICATIONS RESEARCH INSTITUTE, Daejeon (KR)

(72) Inventors: Cheon-Shu Park, Daejeon (KR); Jae-Hong Kim, Daejeon (KR); Jae-Yeon Lee, Daejeon (KR); Min-Su Jang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 112 days.

(21) Appl. No.: 16/206,711

(22) Filed: Nov. 30, 2018

(65) Prior Publication Data
US 2020/0094416 A1 Mar. 26, 2020

(30) Foreign Application Priority Data
Sep. 20, 2018 (KR) .................. 10-2018-0112984

(51) Int. Cl.
*B25J 11/00* (2006.01)
*G10L 15/25* (2013.01)
(Continued)

(52) U.S. Cl.
CPC ......... *B25J 11/0005* (2013.01); *B25J 9/1697* (2013.01); *G06F 3/013* (2013.01);
(Continued)

(58) Field of Classification Search
CPC ....... G10L 15/22; G10L 15/222; G10L 15/25; G10L 2015/227; G06F 9/00302; G06K 3/013; G06K 3/017; B25J 11/0005
(Continued)

(56) References Cited

U.S. PATENT DOCUMENTS 6,795,808 B1 * 9/2004 Strubbe ............... G10L 15/1822
704/275
7,734,468 B2 6/2010 Park et al.
(Continued)

FOREIGN PATENT DOCUMENTS

JP 2018-087847 A 6/2018
KR 100580619 B1 5/2006
(Continued)

OTHER PUBLICATIONS

Breazeal, Cynthia. "Proto-conversations with an anthropomorphic robot." Proceedings 9th IEEE International Workshop on Robot and Human Interactive Communication. IEEE RO-MAN 2000 (Cat. No. 00TH8499). IEEE, Sep. 2000, pp. 328-333. (Year: 2000).*
(Continued)

*Primary Examiner* — James S Wozniak (57) ABSTRACT

Disclosed herein are an interaction apparatus and method. The interaction apparatus includes an input unit for receiving multimodal information including an image and a voice of a target to allow the interaction apparatus to interact with the target, a recognition unit for recognizing turn-taking behavior of the target using the multimodal information, and an execution unit for taking an activity for interacting with the target based on results of recognition of the turn-taking behavior.

12 Claims, 8 Drawing Sheets

(51) Int. Cl.
*G10L 15/22* (2006.01)
*G06K 9/00* (2006.01)
*G06F 3/01* (2006.01)
*B25J 9/16* (2006.01)
*G10L 15/06* (2013.01)

(52) U.S. Cl.
CPC ..... *G06K 9/00342* (2013.01); *G06K 9/00355* (2013.01); *G10L 15/063* (2013.01); *G10L 15/22* (2013.01); *G10L 15/25* (2013.01); *G06F 3/017* (2013.01); *G10L 15/222* (2013.01); *G10L 2015/225* (2013.01); *G10L 2015/227* (2013.01)

(58) Field of Classification Search
USPC .................................................. 704/270, 275
See application file for complete search history.

(56) References Cited

U.S. PATENT DOCUMENTS

| | | | |
|---|---|---|---|
| 7,778,948 B2 * | 8/2010 | Johnson | G09B 7/02 704/8 |
| 7,809,569 B2 | 10/2010 | Attwater et al. | |
| 8,131,553 B2 | 3/2012 | Attwater et al. | |
| 8,442,820 B2 | 5/2013 | Kim et al. | |
| 8,473,420 B2 * | 6/2013 | Bohus | G06Q 10/10 340/541 |
| 10,008,196 B2 | 6/2018 | Maisonnier et al. | |
| 2003/0018475 A1 * | 1/2003 | Basu | G10L 15/25 704/270 |
| 2003/0171932 A1 * | 9/2003 | Juang | G10L 15/24 704/276 |
| 2004/0122673 A1 * | 6/2004 | Park | G10L 15/22 704/270 |
| 2008/0004881 A1 | 1/2008 | Attwater et al. | |
| 2009/0112599 A1 * | 4/2009 | Ljolje | G10L 15/222 704/270 |
| 2010/0324896 A1 | 12/2010 | Attwater et al. | |
| 2011/0164742 A1 * | 7/2011 | Harma | H04M 3/56 379/219 |
| 2014/0156268 A1 * | 6/2014 | Arizmendi | G10L 15/1822 704/231 |
| 2014/0234815 A1 | 8/2014 | Jang et al. | |
| 2015/0039312 A1 * | 2/2015 | Tzirkel-Hancock | G10L 15/265 704/246 |
| 2015/0127340 A1 * | 5/2015 | Epshteyn | G09B 5/00 704/235 |
| 2015/0302846 A1 * | 10/2015 | Song | H04W 56/001 704/275 |
| 2016/0373269 A1 * | 12/2016 | Okubo | G10L 15/24 |
| 2017/0274535 A1 | 9/2017 | Park et al. | |
| 2018/0054688 A1 * | 2/2018 | Cartwright | H04S 7/30 |
| 2018/0144761 A1 * | 5/2018 | Amini | G10L 21/10 |
| 2018/0289308 A1 * | 10/2018 | Lever | A61B 5/0077 |
| 2019/0138096 A1 * | 5/2019 | Lee | G10L 25/51 |
| 2019/0198044 A1 * | 6/2019 | Shimada | G10L 21/0224 |
| 2019/0213429 A1 * | 7/2019 | Sicconi | G06K 9/00335 |
| 2019/0251966 A1 * | 8/2019 | Dharne | G06F 3/017 |
| 2019/0392840 A1 * | 12/2019 | Nakagome | G10L 17/005 |

FOREIGN PATENT DOCUMENTS

| | | |
|---|---|---|
| KR | 20110003811 A | 1/2011 |
| KR | 101092820 B1 | 12/2011 |
| KR | 10-2017-0027705 A | 3/2017 |
| KR | 10-2018-0046649 A | 5/2018 |

OTHER PUBLICATIONS

Angelika Maier et al., "Towards Deep End-of-Turn Prediction for Situated Spoken Dialogue Systems," Proc. Interspeech, 2017, p. 1-5.

Kristiina Jokinen et al., "Gaze and Turn-Taking Behavior in Casual Conversational Interactions," ACM Transactions on Interactive Intelligent Systems, Jul. 2013, p. 12:1-12:30, vol. 3, No. 2, Article 12, ACM.

* cited by examiner

INTERACTION APPARATUS AND METHOD FOR DETERMINING A TURN-TAKING BEHAVIOR USING MULTIMODEL INFORMATION

CROSS REFERENCE TO RELATED APPLICATION

This application claims the benefit of Korean Patent Application No. 10-2018-0112984, filed Sep. 20, 2018, which is hereby incorporated by reference in its entirety into this application.

BACKGROUND OF THE INVENTION

1. Technical Field

The present invention relates generally to technology for interaction between a person and a robot, and more particularly, to technology that recognizes turn-taking behavior during interaction between a person and a robot and takes an activity for interaction.

2. Description of the Related Art

When a person has a conversation, he or she may recognize his or her turn to speak, and may have a conversation with a conversation partner in accordance with the turn to speak. A person may listen to the conversation partner's speech, may interrupt the partner's speech, may make agreeable responses (backchannel), or may continue to talk alone. In this way, a person may recognize his or her turn to speak and then make an utterance in accordance with the turn in conversation in order to make natural interaction with a conversation partner. Here, the term "turn-taking behavior" means the operation of making an utterance between persons and allowing the persons to take turns speaking with each other.

However, it is difficult for a robot which talks with a person to naturally recognize the time at which the person starts or stops a conversation. For example, the robot has difficulty in recognizing the action of a person who intends to start an utterance or stop the utterance of the robot while making an utterance. Also, the robot has difficulty in recognizing the action of a person who intends to stop his or her utterance or the action of the person who intends to continue an utterance while the person is making an utterance.

Meanwhile, as reported in a paper entitled "Gaze and Turn-Taking Behavior in Casual Conversational Interactions", Kristiina Jokinen et al. (2013) conducted research into technology in which taking turns speaking in conversation occurs by monitoring a gaze during a pause time in the conversation between persons, and consequently conducted research into the occurrence of a transition in speaking turns depending on the change in the gaze of each user.

Further, as reported in a paper entitled "Towards Deep End-of-Turn Prediction for Situated Spoken Dialogue Systems", Angelika Maier et al. (2017) conducted research into technology for predicting the end of interaction using the lexical features and acoustic features of voice in the situated spoken dialogue between persons.

Meanwhile, Korean Patent Application Publication No. 10-2017-0027705, entitled "Methods and Systems of Handling a Dialogue with a Robot" discloses a method and system for selecting dialogue execution rules by applying conversation content and a voice skin to an audio dialogue between a robot and a human user.

The above-described conventional technologies mainly determine speaking turns in conversation using voice features, the pause time of a voice, and a change in the gaze of the user in a verbalizing state, and take into consideration only limited clues for recognizing turn-taking behavior, and thus there is a limitation in recognizing accurate turn-taking behavior between a person and a robot.

In order to solve this problem, the present invention is intended to propose an apparatus and method that recognize turn-taking behavior for interaction in relation to various activities of a target using an interaction apparatus and multimodal information about the target, and take activities for interaction based on the results of recognition of the turn-taking behavior.

SUMMARY OF THE INVENTION

Accordingly, the present invention has been made keeping in mind the above problems occurring in the prior art, and an object of the present invention is to recognize turn-taking behavior for a natural conversation between a robot and a person, thus enabling an activity for interaction to be taken.

Another object of the present invention is to allow a robot to detect a person's intention and to recognize turn-taking behavior for natural interaction while the robot or the person is making an utterance.

A further object of the present invention is to support the extension of a conversation model by recognizing turn-taking behavior between a robot and a person.

Yet another object of the present invention is to apply the technology of the invention to a system, such as a chatbot, an artificial intelligence (AI) device, or an AI speaker, which is capable of interacting with a person.

In accordance with an aspect of the present invention to accomplish the above object, there is provided an interaction apparatus, including an input unit for receiving multimodal information including an image and a voice of a target to allow the interaction apparatus to interact with the target; a recognition unit for recognizing turn-taking behavior of the target using the multimodal information; and an execution unit for taking an activity for interacting with the target based on results of recognition of the turn-taking behavior.

The recognition unit may recognize the turn-taking behavior based on any one of multimodal information about the target received while the interaction apparatus is making an utterance and multimodal information about the target received while the target is making an utterance.

The recognition unit may allow the interaction apparatus to recognize four types of actions of the target based on the multimodal information, and may recognize any one of the four types of actions as the turn-taking behavior.

The recognition unit may recognize, as the turn-taking behavior, any one of an action of the target intending to continue an utterance and an action of the target intending to stop an utterance using the multimodal information about the target received while the target is making an utterance.

The recognition unit may recognize, as the turn-taking behavior, any one of an action of the target intending to start an utterance and an action of the target intending to wait for the interaction apparatus to make an utterance using the multimodal information about the target received while the interaction apparatus is making an utterance.

The recognition unit may recognize the turn-taking behavior based on at least one of a lip shape, a lip state, and a gesture of the target received from the multimodal information.

The recognition unit may recognize any one of the action of the target intending to start an utterance and the action of the target intending to wait for the interaction apparatus to make an utterance by detecting a state in which the lips of the target are open as the lip state of the target and by identifying a preset word from the lip shape.

The recognition unit may set a frequency with which the lips of the target are open and a time for which the lips of the target are open while the target is not making an utterance, as weights for detecting the lip state of the target.

The recognition unit may be configured to, when the gesture of the target recognized from the multimodal information is a negative gesture, recognize the gesture as the action of the target intending to start an utterance, and when the gesture of the target is an affirmative gesture, recognize the gesture as the action of the target intending to wait for the interaction apparatus to make an utterance.

The recognition unit may set a higher weight for the negative gesture of the target than for the affirmative gesture of the target when setting weights for recognizing the gesture of the target, thus increasing a probability of recognizing the action of the target intending to start an utterance.

In accordance with another aspect of the present invention to accomplish the above object, there is provided an interaction method for an interaction apparatus, including receiving multimodal information including an image and a voice of a target to allow the interaction apparatus to interact with the target; recognizing turn-taking behavior of the target using the multimodal information; and taking an activity for interacting with the target based on results of recognition of the turn-taking behavior.

Recognizing the turn-taking behavior may be configured to recognize the turn-taking behavior based on any one of multimodal information about the target received while the interaction apparatus is making an utterance and multimodal information about the target received while the target is making an utterance.

Recognizing the turn-taking behavior may be configured to allow the interaction apparatus to recognize four types of actions of the target based on the multimodal information and to recognize any one of the four types of actions as the turn-taking behavior.

Recognizing the turn-taking behavior may be configured to recognize, as the turn-taking behavior, any one of an action of the target intending to continue an utterance and an action of the target intending to stop an utterance using the multimodal information about the target received while the target is making an utterance.

Recognizing the turn-taking behavior may be configured to recognize, as the turn-taking behavior, any one of an action of the target intending to start an utterance and an action of the target intending to wait for the interaction apparatus to make an utterance using the multimodal information about the target received while the interaction apparatus is making an utterance.

Recognizing the turn-taking behavior may be configured to recognize the turn-taking behavior based on at least one of a lip shape, a lip state, and a gesture of the target received from the multimodal information.

Recognizing the turn-taking behavior may be configured to recognize any one of the action of the target intending to start an utterance and the action of the target intending to wait for the interaction apparatus to make an utterance by detecting a state in which the lips of the target are open as the lip state of the target and by identifying a preset word from the lip shape.

Recognizing the turn-taking behavior may be configured to use a frequency with which the lips of the target are open and a time for which the lips of the target are open while the target is not making an utterance, as weights for detecting the lip state of the target.

Recognizing the turn-taking behavior may be configured to, when the gesture of the target recognized from the multimodal information is a negative gesture, recognize the gesture as the action of the target intending to start an utterance, and when the gesture of the target is an affirmative gesture, recognize the gesture as the action of the target intending to wait for the interaction apparatus to make an utterance.

Recognizing the turn-taking behavior may be configured to set a higher weight for the negative gesture of the target than for the affirmative gesture of the target when setting weights for recognizing the gesture of the target, thus increasing a probability of recognizing the action of the target intending to start an utterance.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, preferred embodiments of the present invention will be described in detail with reference to the attached drawings.

Figure 1:
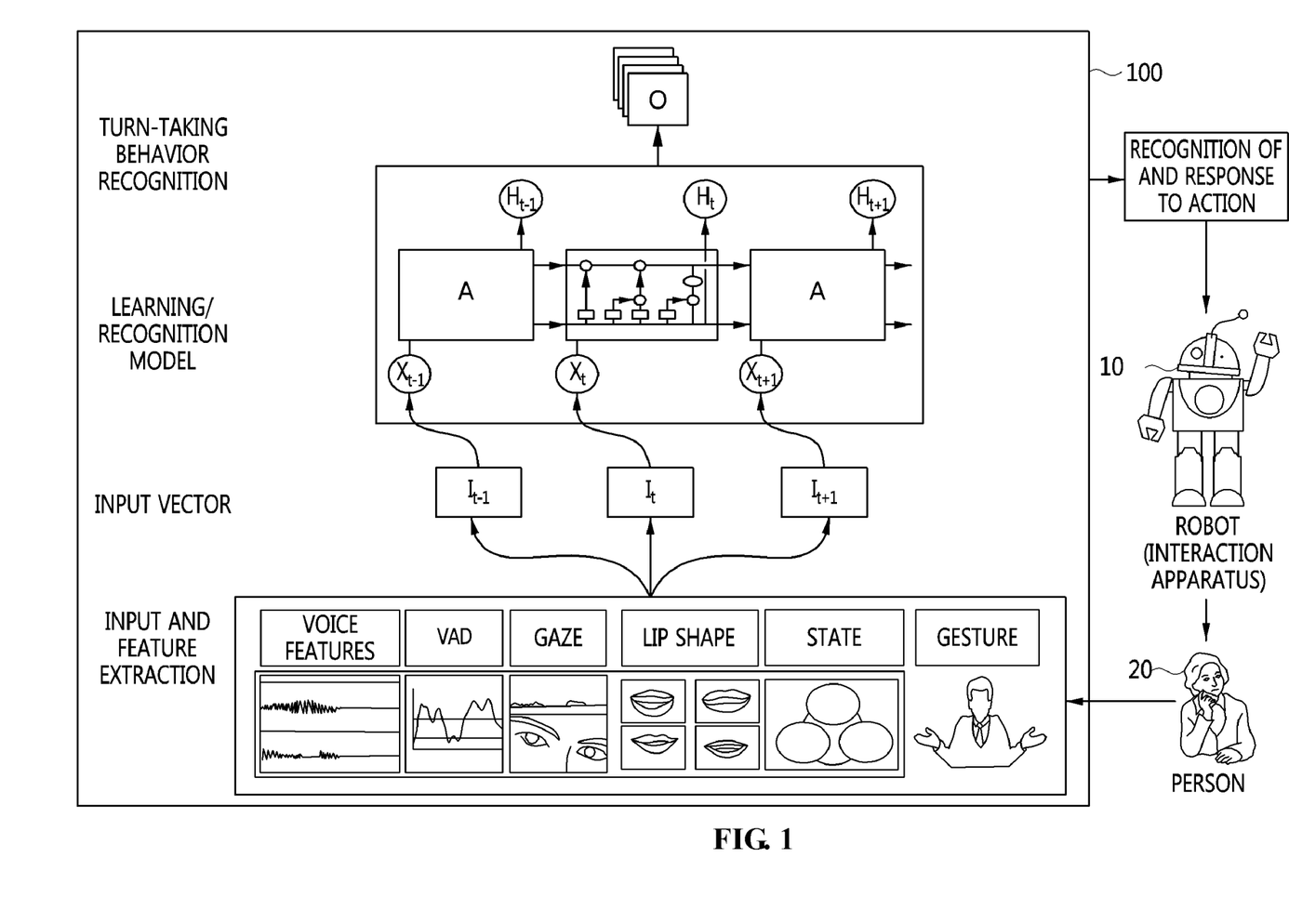
FIG. 1 is a diagram illustrating an interaction system according to an embodiment of the present invention.

FIG. 1 is a diagram illustrating an interaction system according to an embodiment of the present invention.

Referring to FIG. 1, it can be seen that the interaction system according to the embodiment of the present invention is configured such that an interaction apparatus 100 receives multimodal information about an interaction activity between a robot 10 and a target (person) 20, recognizes turn-taking behavior, and takes an activity for interaction therebetween. In this case, the taking an activity for interaction may be performing the activity for interacting with the target and may correspond to generating and performing the response activity (action) corresponding to the intention of the turn-taking behavior of the target.

Here, the interaction apparatus 100 may also be included in the robot 10.

First, the interaction apparatus 100 may receive multimodal information including an image and voice of the target 20.

Here, the interaction apparatus 100 may receive multimodal information that is generated using multimodal clues detected by an image sensor, such as a camera, and an audio sensor, such as a microphone.

The multimodal information may include information about the voice feature detection (acoustic/lexical features) of the target 20, voice activity detection (VAD), a gaze, a lip shape (specific word identification), a lip state (lips-open/closed state), and a gesture (e.g. motion, hand, head, body, negative, and affirmative gestures).

Here, the interaction apparatus 100 may extract multimodal features from the multimodal information, and may generate an input vector. Here, information about the input vector may be changed as time elapses ($I_{t-1}$, $I_t$, $I_{t+1}$).

The interaction apparatus 100 may learn activities for interaction using collected interaction image data sets.

The interaction apparatus 100 may learn activities for interaction from the collected interaction image data sets using a learning model such as a Recurrent Neural Network (RNN) model, and may recognize turn-taking behavior for interaction from the multimodal information.

Here, the interaction apparatus 100 may determine an activity for interaction based on the results of recognition of the turn-taking behavior.

The activity for interaction corresponding to the recognized turn-taking behavior may include a voice activity, an action, a gesture, gaze, etc.

When the interaction apparatus 100 is included in the robot 10, it may take an activity for interaction, whereas when the interaction apparatus 100 is separate from the robot 10, it may send a command for taking an activity for interaction to the robot 10.

Figure 2:
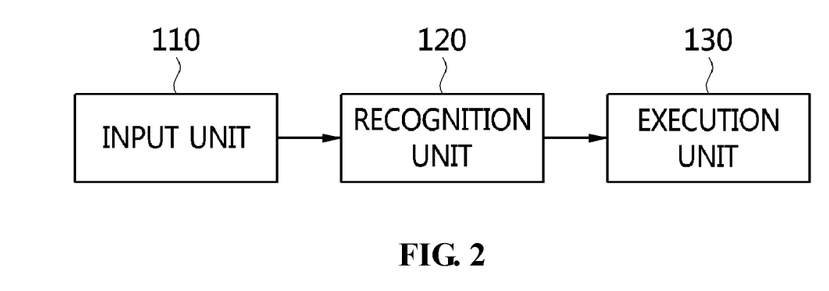
FIG. 2 is a block diagram illustrating an interaction apparatus according to an embodiment of the present invention.

FIG. 2 is a block diagram illustrating an interaction apparatus according to an embodiment of the present invention.

Referring to FIG. 2, the interaction apparatus 100 according to the embodiment of the present invention includes an input unit 110, a recognition unit 120, and an execution unit 130.

The input unit 110 may receive multimodal information including an image and voice of a target 20 in order for the interaction apparatus 100 to interact with the target 20.

The input unit 110 may receive multimodal information that is generated using multimodal clues detected by an image sensor, such as a camera, and an audio sensor, such as a microphone.

The multimodal information may include information about the voice feature detection (acoustic/lexical features) of the target 20, voice activity detection (VAD), a gaze, a lip shape (specific word identification), a lip state (lips-open/closed state), and a gesture (e.g. motion, hand, head, body, negative, and affirmative gestures).

The recognition unit 120 may recognize turn-taking behavior of the target using the multimodal information.

The recognition unit 120 may extract multimodal features from the multimodal information, and may generate an input vector. Here, information about the input vector may be changed as time elapses ($I_{t-1}$, $I_t$, $I_{t+1}$).

The recognition unit 120 may learn activities for interaction using collected interaction image data sets.

The recognition unit 120 may learn activities for interaction from the collected interaction image data sets using a learning model such as a Recurrent Neural Network (RNN) model, and may recognize turn-taking behavior for interaction from the multimodal information.

The recognition unit 120 may recognize turn-taking behavior based on any one of multimodal information about the target 20, received while the interaction apparatus 100 or the robot 10 is making an utterance, and multimodal information about the target 20, received while the target 20 is making an utterance.

The recognition unit 120 may allow the interaction apparatus 100 to recognize four types of actions taken by the target 20 (i.e. TAKE action, WAIT action, HOLD action, and RELEASE action) based on the multimodal information, and may recognize any one of the four types of actions as the turn-taking behavior.

The recognition unit 120 may recognize, as the turn-taking behavior, a state R(s) having the maximum value, as shown in the following Equation (1), among the TAKE action, WAIT action, HOLD action, and RELEASE action, which are the results of recognition of the four types of actions.

$$R(s)=\max[S(t),S(w),S(h),S(r)] \quad (1)$$

The recognition unit 120 may recognize the turn-taking behavior based on at least one of the voice features (acoustic/lexical features) of the target 20, Voice Activity Detection (VAD), gaze, lip shape (specific word identification), lip state (lips-open/closed state), and gesture (e.g. motion, hand, head, body, negative or affirmative gesture), which are recognized from the multimodal information.

Here, the recognition unit 120 may recognize, as the turn-taking behavior, any one of the action of the target 20 intending to start an utterance and the action of the target 20 intending to wait for the interaction apparatus 100 or the robot 10 to make an utterance, based on the multimodal information about the target 20 that is received while the interaction apparatus 100 or the robot 10 is making an utterance.

The result of recognition of the action of the target 20 intending to start an utterance may correspond to the TAKE action, and the result of recognition of the action of the target 20 intending to wait for the interaction apparatus 100 or the robot 10 to make an utterance may correspond to the WAIT action.

In interaction between persons, each person may recognize and respond to content spoken by a conversation partner while making an utterance. However, the robot 10 cannot recognize content spoken by the conversation partner while making an utterance. For example, a commercial robot (e.g. NAO, Pepper, or the like) including a chatbot can recognize its utterance (speech), but cannot recognize the conversation partner's utterance during a conversation, thus making it difficult to make natural interaction because the time point suitable for responding to the conversation partner is missed.

Here, the recognition unit 120 may recognize a TAKE action, as shown in the following Equation (2), based on at least one of the lip shape of the target 20 (examples of specific word identification: "hang on", "however", "be quite", "no", "wait a second", "just a moment", etc.), the lip state of the target 20 (e.g. lips-open/closed state), the gaze of the target 20 (e.g. gaze facing forward during a conversation (gaze_front) and detection of intention to start to speak by making eye contact with the conversation partner), the negative gesture of the target 20 (e.g. the gesture of shaking the target's head or making a hand gesture), and the status of interaction of the interaction apparatus 100 (whether the interaction apparatus 100 is currently making an utterance), which are recognized from the multimodal information.

$$S(t) = \frac{1}{n} \sum_{i=1}^{n} (w_i T_i) \tag{2}$$

$T_i = \{Int, Gaz_f, Lip_s, Lip_r, Ges_n, Rob_s\}, 0 \le w_i \le 1$ $w_i$: weight
Int: whether the target intends to interrupt an utterance
$Gaz_f$: whether the gaze is forward
$Lip_s$: the state of the lips (lips-open/closed state)
$Lip_r$: the shape of the lips (identification of specific words, or lip reading)
VAD: voice activity detection
$Ges_n$: negative gesture
$Rob_s$: whether the robot is making an utterance Here, the recognition unit 120 may calculate the result value S(t) obtained by recognizing the TAKE action by applying both the value $T_i$, obtained by recognizing respective parameters so as to recognize the TAKE action from the multimodal information, and the weight $w_i$ to the above Equation (2).

In this case, the recognition unit 120 may recognize a WAIT action, as shown in the following Equation (3), based on at least one of the lip shape of the target 20 (examples of identification of specific words: "well", "yes, that's right", "yes it is", words for making agreeable responses (backchannel), etc.), the state of the lips of the target 20 (lips-open/closed state), the gaze of the target 20 (e.g. gaze facing forward during a conversation (gaze_front) and detection of intention to wait for the conversation partner to make an utterance by making eye contact with the conversation partner), the affirmative gesture of the target 20 (e.g. the gesture of nodding the target's head), and the status of interaction of the interaction apparatus 100 (whether the interaction apparatus 100 is currently making an utterance), which are recognized from the multimodal information.

$$S(w) = \frac{1}{n} \sum_{i=1}^{n} (w_i W_i) \tag{3}$$

$W_i = \{Bac, VAD, Gaz_f, Ges_a, Lip_r, Rob_s\}, 0 \le w_i \le 1$ $w_i$: weight
Bac: whether the action of making agreeable responses (i.e. backchannel) is taken
$Gaz_f$: whether the gaze is forward
$Lip_s$: the state of the lips (lips-open/closed state)
$Lip_r$: the shape of the lips (identification of specific words or lip reading)
VAD: voice activity detection
$Ges_a$: affirmative gesture
$Rob_s$: whether the robot is making an utterance Here, the recognition unit 120 may calculate the result value S(w) obtained by recognizing a WAIT action by applying both the value $W_i$, obtained by recognizing respective parameters so as to recognize the WAIT action from the multimodal information, and the weight $w_i$ to the above Equation (3).

Further, the recognition unit 120 may recognize any one of the action (TAKE action) of the target 20 who intends to start an utterance and the action (WAIT action) of the target 20 who intends to wait for the interaction apparatus 100 or the robot 10 to make an utterance by detecting the lips-open state of the target 20 as the lip state of the target 20 and by identifying a preset word from the lip shape of the target 20.

In this case, the recognition unit 120 may recognize the frequency with which the lips of the target 20 are open and the time for which the lips of the target 20 are open while the target 20 is not making an utterance, and may set the recognized frequency and time as the weights for detecting the state of the lips of the target 20.

By means of the setting of weights, in the case of a target 20 who habitually opens his or her mouth during a conversation at ordinary times, there may occur an error in detecting the state of the mouth (lips), and thus the recognition unit 120 may periodically monitor whether the target 20 closes and opens his or her mouth when speaking, may determine whether the target 20 is actually speaking or is habitually opening his or her mouth, and may then minimize the occurrence of the error in recognition of turn-taking behavior.

Here, when the gesture of the target 20 recognized from the multimodal information is a negative gesture, the recognition unit 120 recognizes the current gesture as the action (i.e. TAKE action) of the target 20 who intends to start an utterance. In contrast, when the gesture of the target 20 is an affirmative gesture, the recognition unit 120 may recognize the current gesture as the action (i.e. WAIT action) of the target 20 who intends to wait for the interaction apparatus 100 or the robot 10 to make an utterance.

In this case, the recognition unit 120 may set a higher weight for the negative gesture of the target 20 than for the affirmative gesture of the target 20 when setting weights for recognizing the gesture of the target 20, thus increasing the possibility of recognizing the action of the target 20 intending to start an utterance.

Furthermore, the recognition unit 120 may recognize, as the turn-taking behavior, any one of the action (i.e. HOLD action) of the target 20 who intends to continue (hold) an utterance and the action (i.e. RELEASE action) of the target 20 who intends to stop (release) an utterance, based on the multimodal information about the target 20 that is received while the target 20 is making an utterance.

Here, the result of recognizing the action of the target 20 intending to continue an utterance may correspond to the HOLD action, and the result of recognizing the action of the target 20 intending to stop an utterance may correspond to the RELEASE action.

The recognition unit 120 may recognize the HOLD action, as shown in the following Equation (4) based on at least one of the gaze of the target 20 (e.g. gaze facing forward during a conversation (gaze_front) and detection of intention to continue an utterance by making eye contact with the conversation partner), the gesture of continuing an utterance (e.g. a gesture such as the action of making a hand gesture or a body gesture together with the utterance), and the status of interaction of the interaction apparatus 100 (whether the interaction apparatus 100 is currently making an utterance), which are recognized from the multimodal information.

$$S(h) = \frac{1}{n}\sum_{i=1}^{n}(w_i H_i) \quad (4)$$

$H_i = \{Ges, Gaz_f, VAD, Rob_s\}, 0 \leq w_1 \leq 1$ $w_i$: weight
Ges: gesture (hand gesture or body gesture)
$Gaz_f$: whether the gaze is forward
VAD: voice activity detection
$Rob_s$: whether the robot is making an utterance Here, the recognition unit 120 may calculate the value of recognition of the gesture Ges based on at least one of a speech-start action (speech_start), a speech-end action (speech_end), a hand gesture (gesture_hand), a body gesture (gesture_body), and a head gesture (gesture_head).

Here, the recognition unit 120 may calculate the result value S(h) obtained by recognizing the HOLD action by applying both the value $H_i$, obtained by recognizing respective parameters so as to recognize the HOLD action from the multimodal information, and the weight $w_i$ to the above Equation (4).

The recognition unit 120 may recognize the RELEASE action, as shown in the following Equation (5), based on at least one of the state of the lips (lips-open/closed state) of the target 20, the gaze of the target 20 (e.g. gaze facing forward during a conversation (gaze_front) and recognition of the action of stopping a speech and adjusting the gaze by making eye contact with the partner), the stop gesture of the target 20 (e.g. a gesture such as the action of stopping a speech), and the status of interaction of the interaction apparatus 100 (whether the interaction apparatus 100 is currently making an utterance), which are recognized from the multimodal information.

$$S(r) = \frac{1}{n}\sum_{i=1}^{n}(w_i R_i) \quad (5)$$

$R_i = \{VAD_p, Gaz_f, Lip_s, Ges\}, 0 \leq w_i \leq 1$ $w_d$: weight
$Gaz_f$: whether the gaze is forward
$Lip_s$: the state of the lips (lips-open/closed state)
$VAD_p$: voice activity detection when an utterance is paused
Ges: stop gesture
$Rob_s$: whether the robot is making an utterance In this case, the recognition unit 120 may calculate the $VAD_p$ value in consideration of a section in which a preset utterance is paused depending on the age, gender, and personal characteristics of the target 20.

In this case, for an adult, the section in which the utterance is paused may be an interval ranging from 50 ms to 500 ms, and, for the aged, the section may be longer than that of the adult.

In this case, the recognition unit 120 may calculate the result value S(r) obtained by recognizing the RELEASE action by applying both the value $R_i$, obtained by recognizing respective parameters so as to recognize the RELEASE action from the multimodal information, and the weight $w_i$ to the above Equation (5).

Here, the recognition unit 120 may detect the state in which the lips of the target 20 are open (lips-open state) as the lip state of the target 20 and identify a preset word from the lip shape, and may then recognize any one of the action of the target 20 who intends to start an utterance (i.e. TAKE action) and the action of the target 20 who intends to wait for the interaction apparatus 100 or the robot 10 to make an utterance (i.e. WAIT action).

In this case, the recognition unit 120 may recognize the frequency with which the lips of the target 20 are open and the time for which the lips of the target 20 are open while the target 20 is not making an utterance, and may set the recognized frequency and time as the weights for detecting the state of the lips of the target 20.

By means of the setting of weights, in the case of a target 20 who habitually opens his or her mouth during a conversation at ordinary times, there may occur an error in detecting the state of the mouth (lips), and thus the recognition unit 120 may periodically monitor whether the target 20 closes and opens his or her mouth when speaking, may determine whether the target 20 is actually speaking or is habitually opening his or her mouth, and may then minimize the occurrence of the error in recognition of turn-taking behavior.

In this case, when the VAD result of the target 20 who is currently making an utterance, recognized from the multimodal information, indicates that the utterance is paused for a preset period of time, the recognition unit 120 may recognize the current action as the action of stopping (releasing) an utterance (i.e. RELEASE action). When the VAD result indicates that the utterance is resumed within the preset period of time, the recognition unit 120 may recognize the current action as the action of intending to continue an utterance (i.e. HOLD action).

Here, even if the utterance of the target 20 is paused for a preset period of time, the recognition unit 120 may recognize the current action as the action of intending to continue an utterance when the gesture of the target 20 is a gesture for continuing the utterance.

Here, when the utterance of the target 20 is paused for a preset period of time, the recognition unit 120 may recognize the current action as the action of intending to stop the utterance (i.e. RELEASE action) if the gaze of the target 20 forwardly faces the interaction apparatus 100 or the robot 10 and if the state of the lips is a closed state.

At this time, the recognition unit 120 may determine an activity for interaction based on the results of recognition of the turn-taking behavior.

Here, the activity for interaction corresponding to the recognized turn-taking behavior may include a voice, an action, a gesture, a gaze, etc.

The execution unit 130 may take an activity for interacting with the target 20 based on the results of recognition of the turn-taking behavior.

In this case, when the interaction apparatus 100 is included in the robot 10, the execution unit 130 may take the activity for interaction, whereas when the interaction apparatus 100 is separate from the robot 10, the execution unit 130 may send a command for taking the activity for interaction to the robot 10.

Figure 3:
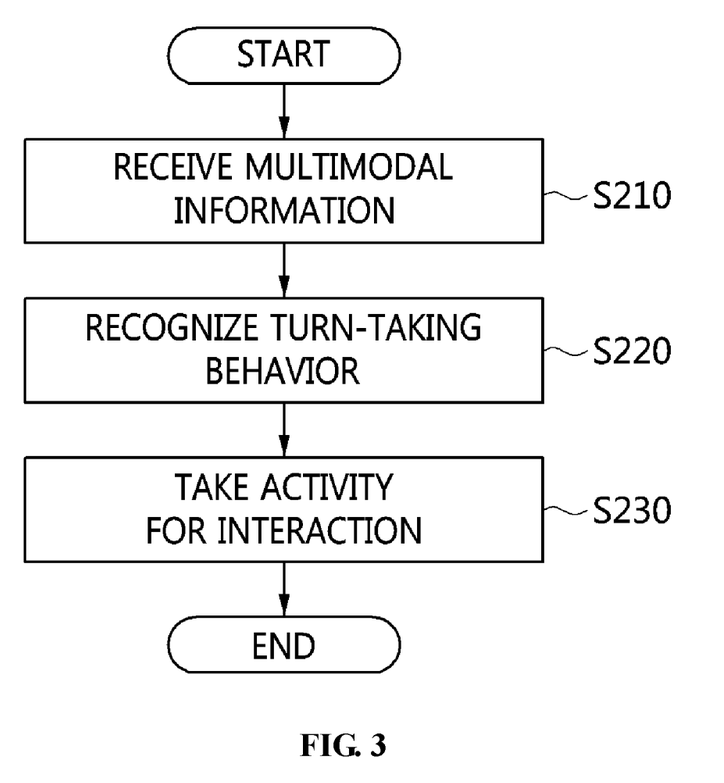
FIG. 3 is an operation flowchart illustrating an interaction method according to an embodiment of the present invention.
Figure 4:
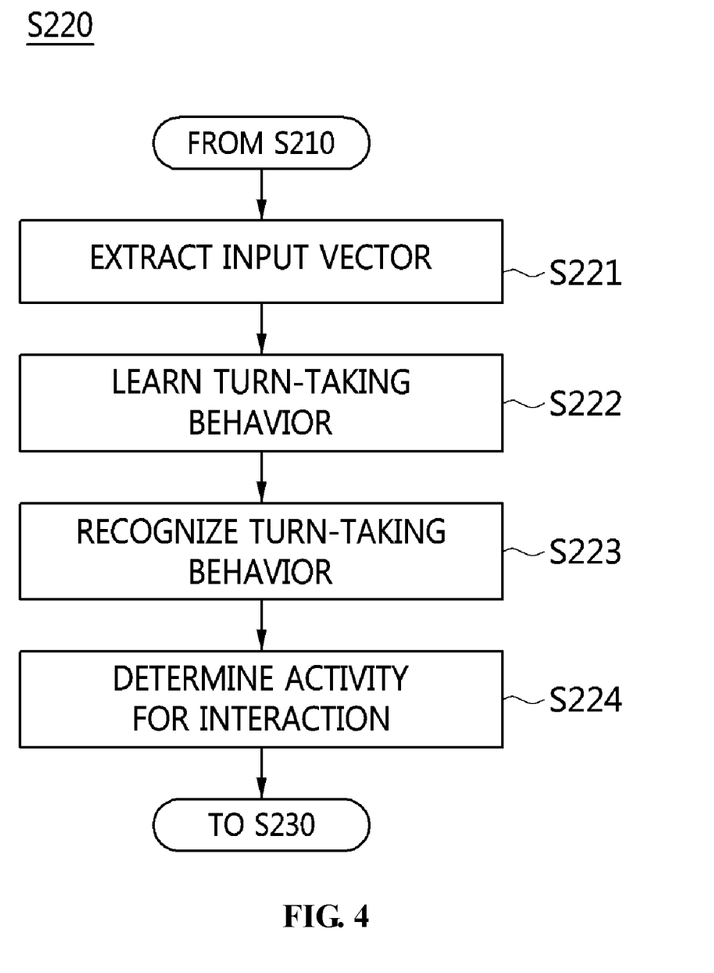
FIG. 4 is an operation flowchart illustrating in detail an example of the turn-taking behavior recognition step of FIG. 3.

FIG. 3 is an operation flowchart illustrating an interaction method according to an embodiment of the present invention. FIG. 4 is an operation flowchart illustrating in detail an example of the turn-taking behavior recognition step of FIG. 3.

Referring to FIG. 3, in the interaction method according to the embodiment of the present invention, multimodal information may be input first at step S210.

That is, at step S210, the input unit 110 may receive multimodal information including an image and voice of a target 20 in order for the interaction apparatus 100 to interact with the target 20.

Here, at step S210, the input unit 110 may receive multimodal information that is generated using multimodal clues detected by an image sensor, such as a camera, and an audio sensor, such as a microphone.

The multimodal information may include information about the voice feature detection (acoustic/lexical features) of the target 20, voice activity detection (VAD), a gaze, a lip shape (specific word identification), a lip state (lips-open/closed state), and a gesture (e.g. motion, hand, head, body, negative, and affirmative gestures).

Next, in the interaction method according to the embodiment of the present invention, turn-taking behavior may be recognized at step S220.

That is, at step S220, turn-taking behavior of the target may be recognized using the multimodal information.

Referring to FIG. 4, in a procedure at step S220, an input vector may be extracted at step S221.

That is, at step S221, multimodal features may be extracted from the multimodal information, and an input vector may be generated. Here, information about the input vector may be changed as time elapses ($I_{t-1}$, $I_t$, $I_{t+1}$).

Further, in the procedure at step S220, the turn-taking behavior may be learned at step S222.

That is, at step S222, activities for interaction may be learned using collected interaction image data sets.

Here, at step S222, activities for interaction may be learned from the collected interaction image data sets using a learning model such as a Recurrent Neural Network (RNN) model, and turn-taking behavior for interaction may be recognized from the multimodal information.

Next, in the procedure at step S220, the turn-taking behavior may be recognized at step S223.

That is, at step S223, the turn-taking behavior may be recognized based on any one of multimodal information about the target 20, received while the interaction apparatus 100 or the robot 10 is making an utterance, and multimodal information about the target 20, received while the target 20 is making an utterance.

At step S223, the interaction apparatus 100 recognizes four types of actions taken by the target 20 (i.e. TAKE action, WAIT action, HOLD action, and RELEASE action) based on the multimodal information, and then any one of the four types of actions may be recognized as the turn-taking behavior.

Here, at step S223, a state R(s) having the maximum value, as shown in Equation (1), among the TAKE action, WAIT action, HOLD action, and RELEASE action, which are the results of recognition of the four types of actions, may be recognized as the as the turn-taking behavior.

At step S223, the turn-taking behavior may be recognized based on at least one of the voice features (acoustic/lexical features) of the target 20, Voice Activity Detection (VAD), gaze, lip shape (specific word identification), lip state (lips-open/closed state), and gesture (e.g. motion, hand, head, body, negative or affirmative gesture), which are recognized from the multimodal information.

Here, at step S223, any one of the action of the target 20 intending to start an utterance and the action of the target 20 intending to wait for the interaction apparatus 100 or the robot 10 to make an utterance may be recognized as the turn-taking behavior, based on the multimodal information about the target 20 that is received while the interaction apparatus 100 or the robot 10 is making an utterance.

The result of recognition of the action of the target 20 intending to start an utterance may correspond to the TAKE action, and the result of recognition of the action of the target 20 intending to wait for the interaction apparatus 100 or the robot 10 to make an utterance may correspond to the WAIT action.

In interaction between persons, each person may recognize and respond to content spoken by a conversation partner while making an utterance. However, the robot 10 cannot recognize content spoken by the conversation partner while making an utterance. For example, a commercial robot (e.g. NAO, Pepper, or the like) including a chatbot can recognize its utterance (speech), but cannot recognize the conversation partner's utterance during a conversation, thus making it difficult to make natural interaction because the time point suitable for responding to the conversation partner is missed.

Here, at step S223, a TAKE action may be recognized, as shown in Equation (2), based on at least one of the lip shape of the target 20 (examples of specific word identification: "hang on", "however", "be quite", "no", "wait a second", "just a moment", etc.), the lip state of the target 20 (e.g. lips-open/closed state), the gaze of the target 20 (e.g. gaze facing forward during a conversation (gaze_front) and detection of intention to start to speak by making eye contact with the conversation partner), the negative gesture of the target 20 (e.g. the gesture of shaking the target's head or making a hand gesture), and the status of interaction of the interaction apparatus 100 (whether the interaction apparatus 100 is currently making an utterance), which are recognized from the multimodal information.

At step S223, the result value S(t) obtained by recognizing the TAKE action may be calculated by applying both the value $T_i$, obtained by recognizing respective parameters so as to recognize the TAKE action from the multimodal information, and the weight $w_i$ to Equation (2).

At step S223, a WAIT action may be recognized, as shown in Equation (3), based on at least one of the lip shape of the target 20 (examples of identification of specific words: "well", "yes, that's right", "yes it is", words for making agreeable responses (backchannel), etc.), the state of the lips of the target 20 (lips-open/closed state), the gaze of the target 20 (e.g. gaze facing forward during a conversation (gaze_front) and detection of intention to wait for the conversation partner to make an utterance by making eye contact with the conversation partner), the affirmative gesture of the target 20 (e.g. the gesture of nodding the target's head), and the status of interaction of the interaction apparatus 100 (whether the interaction apparatus 100 is currently making an utterance), which are recognized from the multimodal information.

Here, at step S223, the result value S(w) obtained by recognizing a WAIT action may be calculated by applying both the value $W_i$, obtained by recognizing respective parameters so as to recognize the WAIT action from the multimodal information, and the weight $w_i$ to Equation (3).

At step S223, any one of the action (TAKE action) of the target 20 who intends to start an utterance and the action (WAIT action) of the target 20 who intends to wait for the interaction apparatus 100 or the robot 10 to make an utterance may be recognized by detecting the lips-open state of the target 20 as the lip state of the target 20 and by identifying a preset word from the lip shape of the target 20.

Here, at step S223, the frequency with which the lips of the target 20 are open and the time for which the lips of the target 20 are open while the target 20 is not making an utterance may be recognized and set as the weights for detecting the state of the lips of the target 20.

In the case of a target 20 who habitually opens his or her mouth during a conversation at ordinary times, there may occur an error in detecting the state of the mouth (lips). Therefore, at step S223, by means of the setting of weights, whether the target 20 closes and opens his or her mouth when speaking is periodically monitored, and whether the target 20 is actually speaking or is habitually opening his or her mouth is determined, and thus the occurrence of the error in recognition of turn-taking behavior may be minimized.

At step S223, when the gesture of the target 20 recognized from the multimodal information is a negative gesture, the current gesture may be recognized as the action (i.e. TAKE action) of the target 20 who intends to start an utterance. In contrast, when the gesture of the target 20 is an affirmative gesture, the current gesture may be recognized as the action (i.e. WAIT action) of the target 20 who intends to wait for the interaction apparatus 100 or the robot 10 to make an utterance.

In this case, at step S223, when weights for recognizing the gesture of the target 20 are set, a higher weight for the negative gesture of the target 20 than for the affirmative gesture of the target 20 may be set, thus increasing the possibility of recognizing the action of the target 20 intending to start an utterance.

Furthermore, at step S223, any one of the action (i.e. HOLD action) of the target 20 who intends to continue (hold) an utterance and the action (i.e. RELEASE action) of the target 20 who intends to stop (release) an utterance, may be recognized as the turn-taking behavior, based on the multimodal information about the target 20 that is received while the target 20 is making an utterance.

Here, the result of recognizing the action of the target 20 intending to continue an utterance may correspond to the HOLD action, and the result of recognizing the action of the target 20 intending to stop an utterance may correspond to the RELEASE action.

At step S223, the HOLD action may be recognized, as shown in Equation (4) based on at least one of the gaze of the target 20 (e.g. gaze facing forward during a conversation (gaze_front) and detection of intention to continue an utterance by making eye contact with the conversation partner), the gesture of continuing an utterance (e.g. a gesture such as the action of making a hand gesture or a body gesture together with the utterance), and the status of interaction of the interaction apparatus 100 (whether the interaction apparatus 100 is currently making an utterance), which are recognized from the multimodal information.

Here, at step S223, the value of recognition of the gesture Ges may be calculated based on at least one of a speech-start action (speech_start), a speech-end action (speech_end), a hand gesture (gesture_hand), a body gesture (gesture_body), and a head gesture (gesture_head).

Here, at step S223, the result value S(h) obtained by recognizing the HOLD action may be calculated by applying both the value $H_i$, obtained by recognizing respective parameters so as to recognize the HOLD action from the multimodal information, and the weight $w_i$ to Equation (4).

At step S223, the RELEASE action may be recognized, as shown in Equation (5), based on at least one of the state of the lips (lips-open/closed state) of the target 20, the gaze of the target 20 (e.g. gaze facing forward during a conversation (gaze_front) and recognition of the action of stopping a speech and adjusting the gaze by making eye contact with the partner), the stop gesture of the target 20 (e.g. a gesture such as the action of stopping a speech), and the status of interaction of the interaction apparatus 100 (whether the interaction apparatus 100 is currently making an utterance), which are recognized from the multimodal information.

At step S223, the voice activity detection value $VAD_p$ may be calculated in consideration of a section in which a preset utterance is paused depending on the age, gender, and personal characteristics of the target 20.

In this case, for an adult, the section in which the utterance is paused may be an interval ranging from 50 ms to 500 ms, and, for the aged, the section may be longer than that of the adult.

At step S223, the result value S(r) obtained by recognizing the RELEASE action may be calculated by applying both the value $R_i$, obtained by recognizing respective parameters so as to recognize the RELEASE action from the multimodal information, and the weight $w_i$ to Equation (5).

At step S223, the state in which the lips of the target 20 are open (lips-open state) may be detected as the lip state of the target 20 and a preset word may be identified from the lip shape, and then any one of the action of the target 20 who intends to start an utterance (i.e. TAKE action) and the action of the target 20 who intends to wait for the interaction apparatus 100 or the robot 10 to make an utterance (i.e. WAIT action) may be recognized.

In this case, at step S223, the frequency with which the lips of the target 20 are open and the time for which the lips of the target 20 are open while the target 20 is not making an utterance may be recognized and set as the weights for detecting the state of the lips of the target 20.

In the case of a target 20 who habitually opens his or her mouth during a conversation at ordinary times, there may occur an error in detecting the state of the mouth (lips). Therefore, at step S223, by means of the setting of weights, whether the target 20 closes and opens his or her mouth when speaking may be periodically monitored, and whether the target 20 is actually speaking or is habitually opening his or her mouth may be determined, and then the occurrence of the error in recognition of turn-taking behavior may be minimized.

In this case, at step S223, when the VAD result of the target 20 who is currently making an utterance, recognized from the multimodal information, indicates that the utterance is paused for a preset period of time, the current action may be recognized as the action of stopping an utterance (i.e. RELEASE action). When the VAD result indicates that the utterance is resumed within the preset period of time, the current action may be recognized as the action of intending to continue an utterance (i.e. HOLD action).

At step S223, even if the utterance of the target 20 is paused for a preset period of time, the current action may be recognized as the action of intending to continue an utterance when the gesture of the target 20 is a gesture for continuing the utterance.

At step S223, when the utterance of the target 20 is paused for a preset period of time, the current action may be recognized as the action of intending to stop the utterance (i.e. RELEASE action) if the gaze of the target 20 forwardly faces the interaction apparatus 100 or the robot 10 and if the state of the lips is a closed state.

Further, in the procedure at step S220, an activity for interaction may be determined at step S224.

That is, at step S224, an activity for interaction may be determined based on the results of recognition of the turn-taking behavior.

Here, the activity for interaction corresponding to the recognized turn-taking behavior may include a voice, an action, a gesture, a gaze, etc.

Next, in the interaction method according to the embodiment of the present invention, the activity for interaction may be taken at step S230.

That is, at step S230, an activity for interacting with the target 20 may be taken based on the results of recognition of the turn-taking behavior.

In this case, at step S230, when the interaction apparatus 100 is included in the robot 10, the activity for interaction may be taken, whereas when the interaction apparatus 100 is separate from the robot 10, a command for taking the activity for interaction may be sent to the robot 10.

Figure 5:
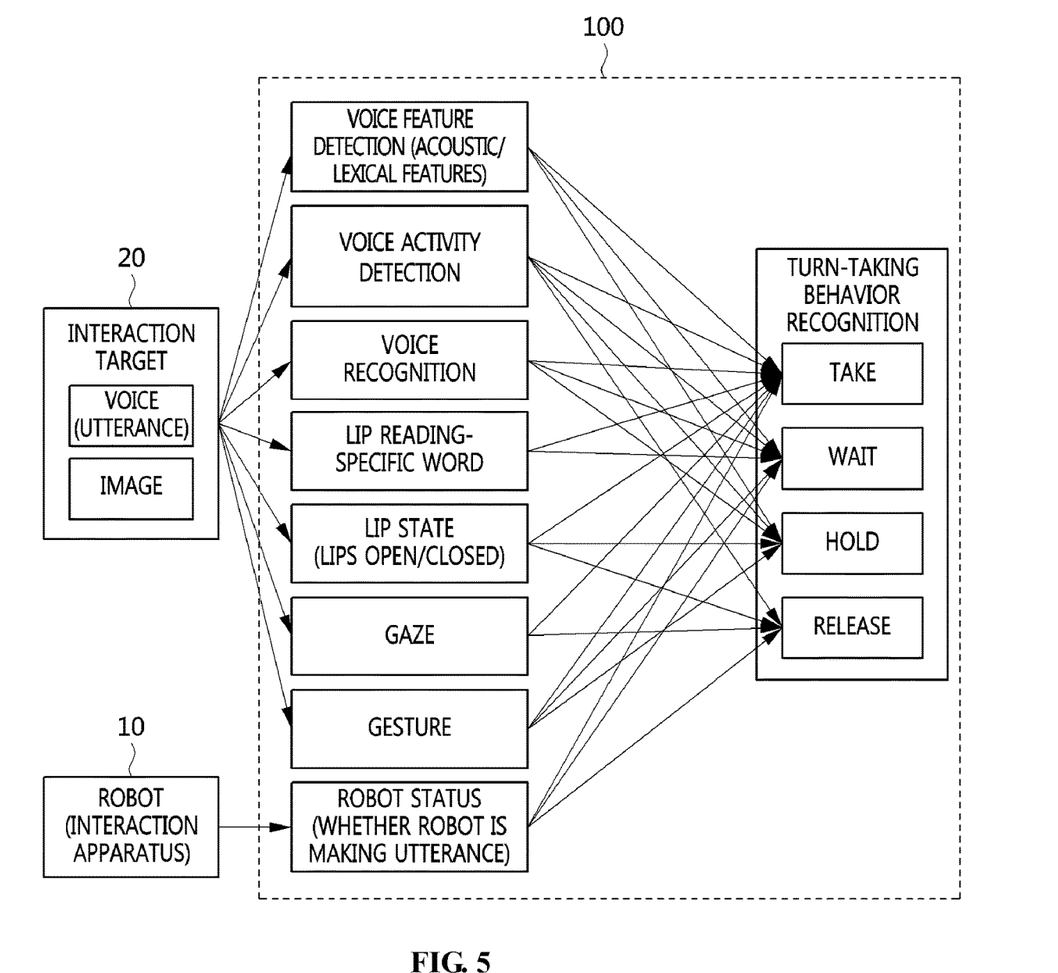
FIG. 5 is a block diagram illustrating relationships between multimodal information and turn-taking behavior recognition according to an embodiment of the present invention.
Figure 6:
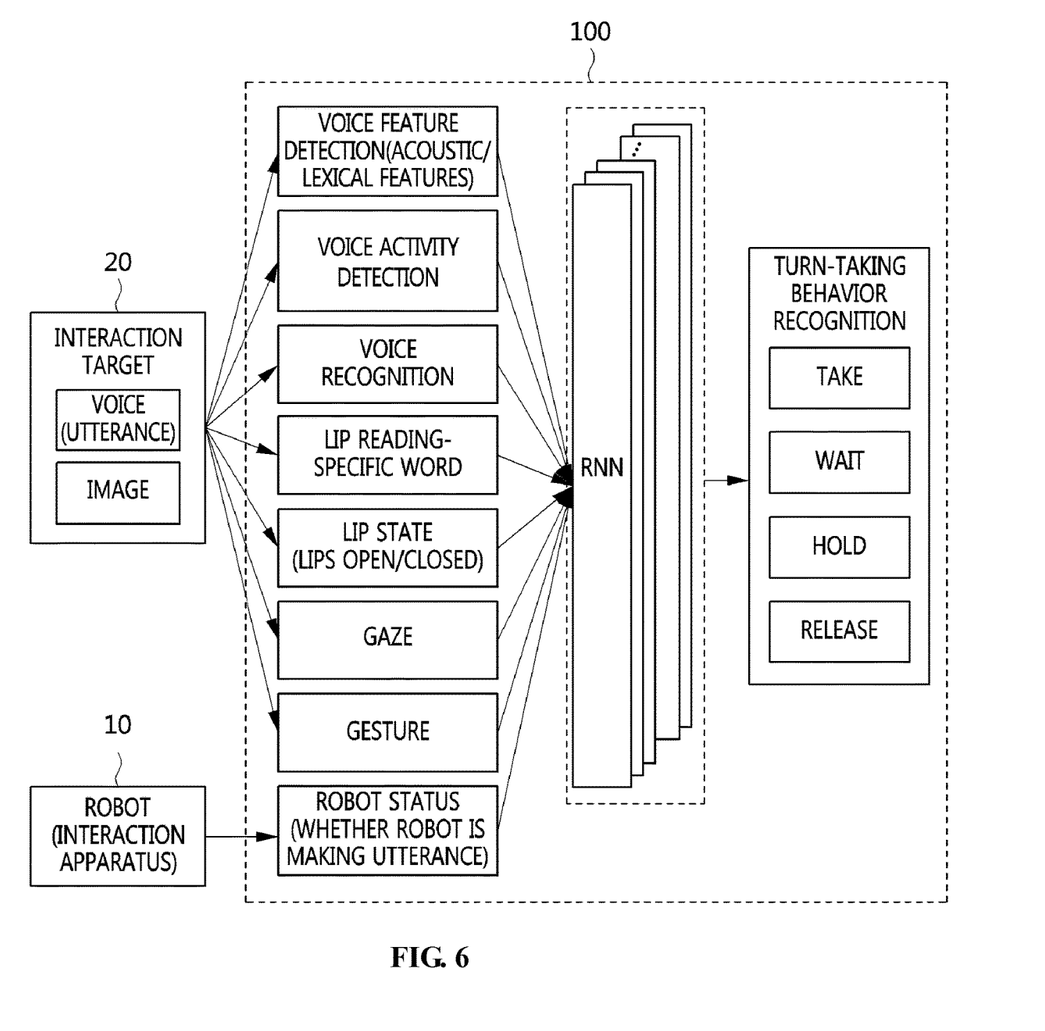
FIG. 6 is a block diagram illustrating relationships between multimodal information and turn-taking behavior recognition using deep learning according to an embodiment of the present invention.

FIG. 5 is a block diagram illustrating relationships between multimodal information and turn-taking behavior recognition according to an embodiment of the present invention, and FIG. 6 is a block diagram illustrating relationships between multimodal information and turn-taking behavior recognition using deep learning according to an embodiment of the present invention.

Referring to FIGS. 5 and 6, the interaction apparatus 100 according to the embodiment of the present invention may receive multimodal information from an interaction target 20 and a robot 10, and may extract, from multimodal clues, information about voice features, voice activities, voice recognition, a lip shape (lip reading), a lip state, a gaze, a gesture, and the robot's interaction activity state, as input vectors.

Here, the interaction apparatus 100 may recognize any one of four types of turn-taking behavior (TAKE action, WAIT action, HOLD action, and RELEASE action) related to the interaction target 20 using the input vectors extracted from the multimodal information.

In this case, as illustrated in FIG. 6, the interaction apparatus 100 may recognize the turn-taking behavior based on a data model that is learned using data sets for interaction activity images when recognizing the turn-taking behavior from the input vectors.

For example, the interaction apparatus 100 may learn activities for interaction from interaction image data sets collected using a learning model, such as a Recurrent Neural Network (RNN) model, and may recognize turn-taking behavior for interaction from the multimodal information.

Figure 7:
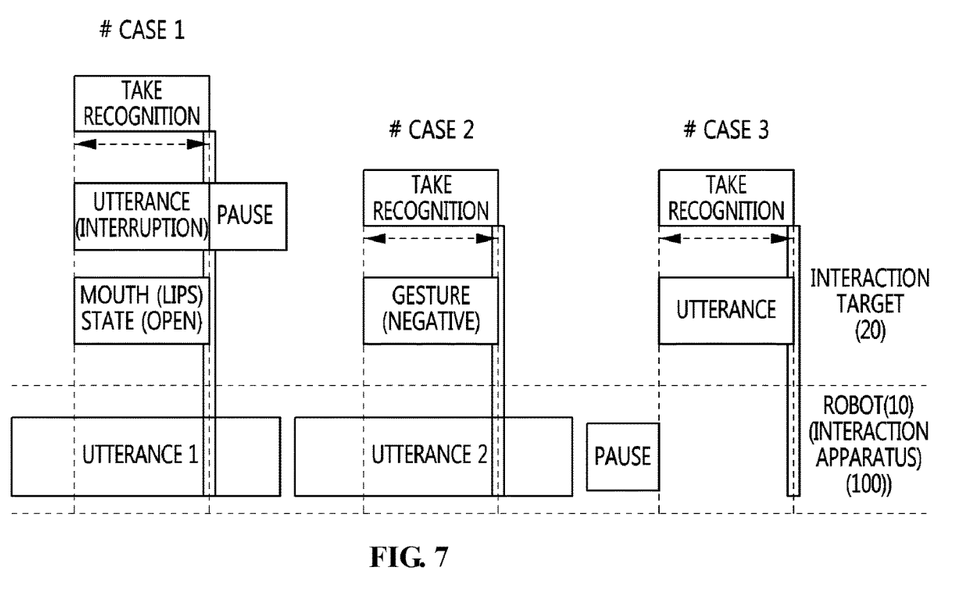
FIG. 7 is a diagram illustrating the case where the action of a target who intends to start an utterance is recognized according to an embodiment of the present invention.

FIG. 7 is a diagram illustrating the case where the action of a target who intends to start an utterance is recognized according to an embodiment of the present invention.

Referring to FIG. 7, the interaction apparatus 100 according to the embodiment of the present invention may recognize a TAKE action when a gesture and voice features corresponding to the action of the interaction target 20 who intends to start an utterance (i.e. interruption) are detected and the lips (mouth) of the interaction target 20 are open while interaction apparatus 100 is making an utterance, as in CASE 1.

Further, the interaction apparatus 100 according to the embodiment of the present invention may recognize a TAKE action when recognizing a negative gesture made by the interaction target 20 while making an utterance, as in CASE 2.

Furthermore, the interaction apparatus 100 according to the embodiment of the present invention may recognize the TAKE action when the interaction target 20 starts to make an utterance while not making an utterance, as in CASE 3.

Figure 8:
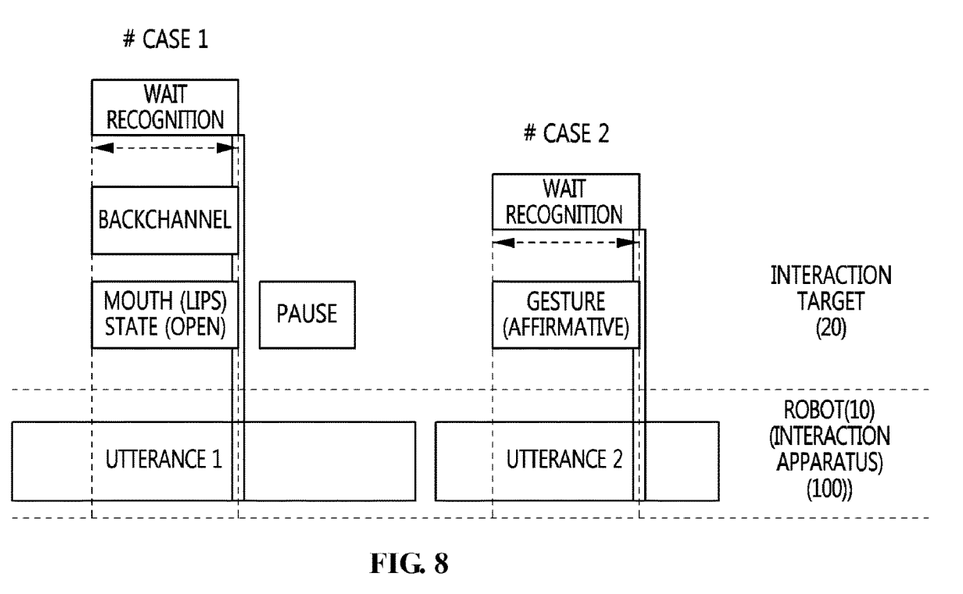
FIG. 8 is a diagram illustrating the case where the action of a target who intends to wait for an interaction apparatus to make an utterance is recognized according to an embodiment of the present invention.

FIG. 8 is a diagram illustrating the case where the action of a target who intends to wait for an interaction apparatus to make an utterance is recognized according to an embodiment of the present invention.

Referring to FIG. 8, the interaction apparatus 100 according to the embodiment of the present invention may recognize a WAIT action and continue an utterance when recognizing a backchannel by the interaction target 20 and the lips-open state of the interaction target 20 while making an utterance, as in CASE 1.

Further, the interaction apparatus 100 according to the embodiment of the present invention may recognize the WAIT action and continue an utterance when recognizing an affirmative gesture made by the interaction target 20 while making an utterance, as in CASE 2.

Figure 9:
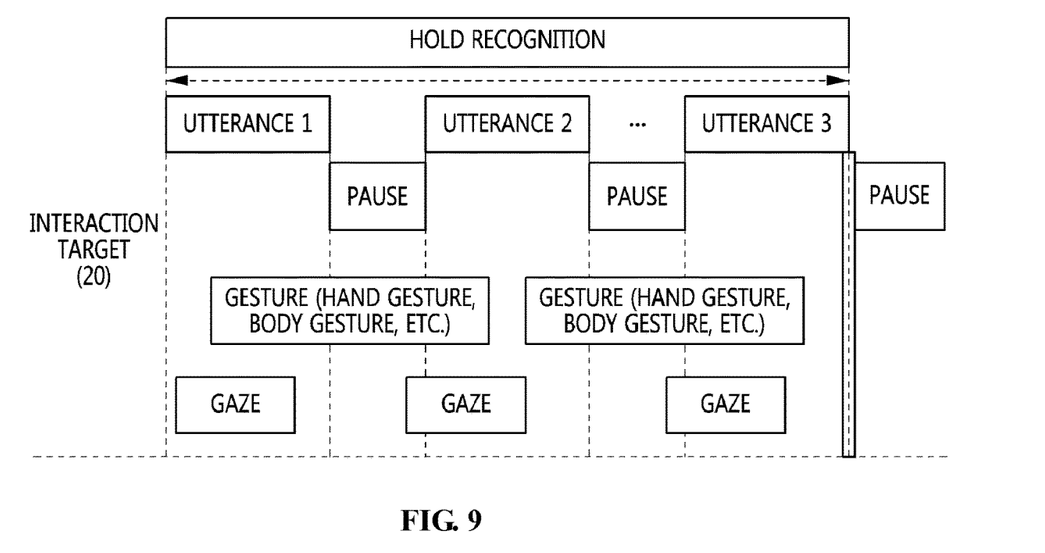
FIG. 9 is a diagram illustrating the case where the action of a target who intends to continue an utterance is recognized according to an embodiment of the present invention.

FIG. 9 is a diagram illustrating the case where the action of a target who intends to continue an utterance is recognized according to an embodiment of the present invention.

Referring to FIG. 9, even if the gaze of the interaction target 20 who is making an utterance is maintained, and the utterance is paused (PAUSE), the interaction apparatus 100 according to the embodiment of the present invention may recognize a HOLD action when the utterance is resumed or the gesture of intending to continue an utterance is recognized within a preset period of time.

Figure 10:
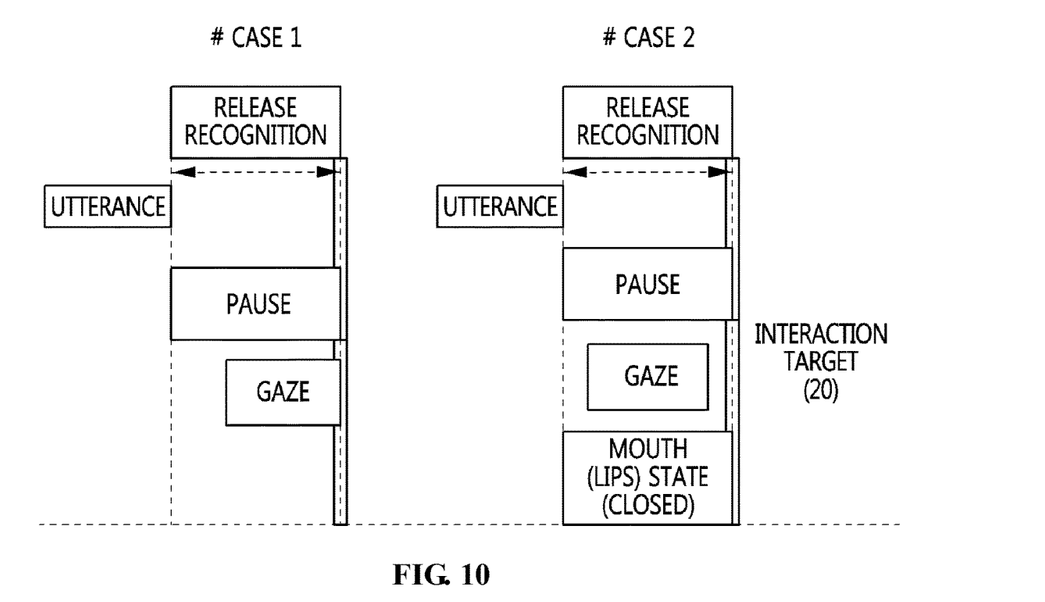
FIG. 10 is a diagram illustrating the case where the action of a target who intends to stop an utterance is recognized according to an embodiment of the present invention.

FIG. 10 is a diagram illustrating the case where the action of a target who intends to release an utterance is recognized according to an embodiment of the present invention.

Referring to FIG. 10, when the gaze of the interaction target 20 who is making an utterance is maintained and the utterance is paused for a preset period of time, as in CASE 1, the interaction apparatus 100 according to the embodiment of the present invention may recognize a RELEASE action.

Further, when the gaze of the interaction target 20 who is making an utterance is maintained and the utterance is paused for a preset period of time, and when the lip state of the interaction target 20 is a closed state, as in CASE 2, the interaction apparatus 100 according to the embodiment of the present invention may recognize the RELEASE action.

Figure 11:
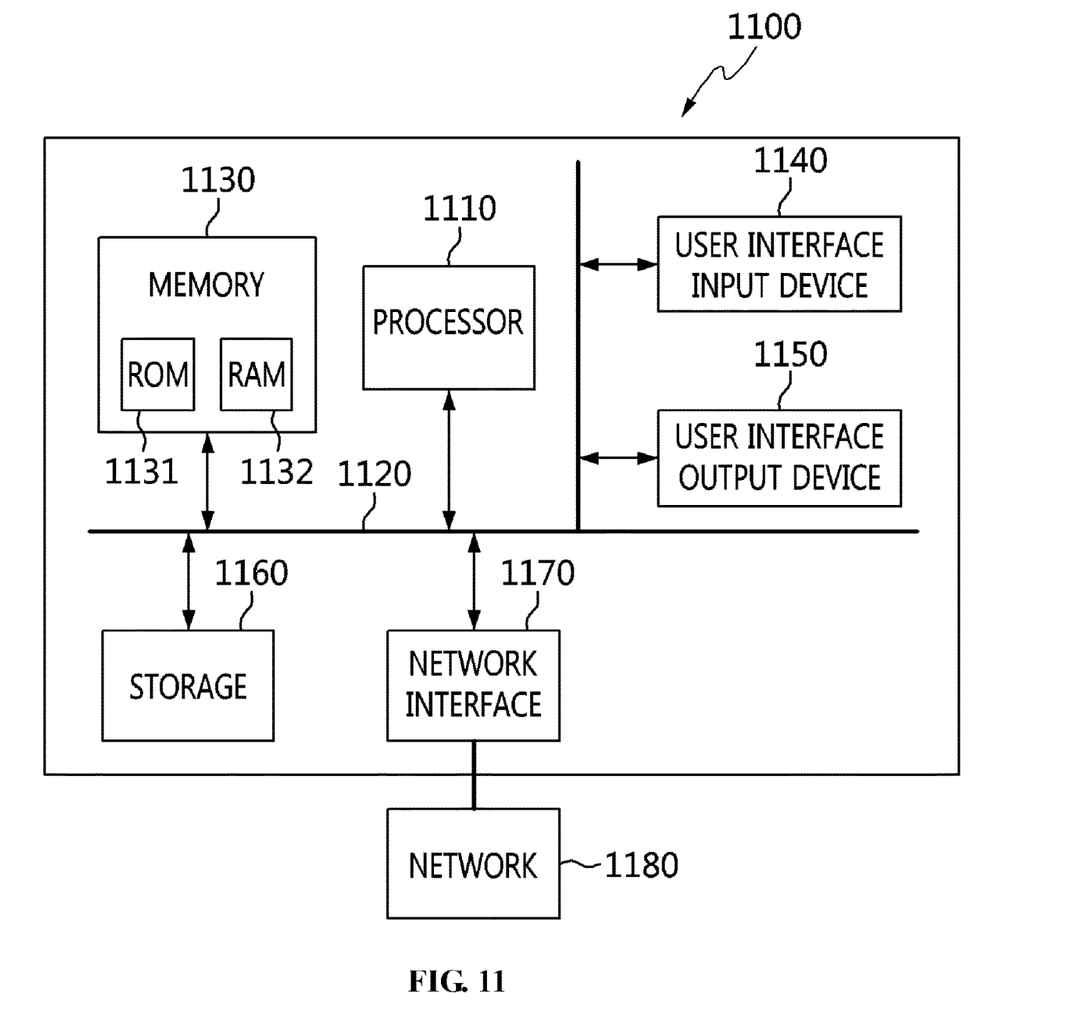
FIG. 11 is a diagram illustrating a computer system according to an embodiment of the present invention.

FIG. 11 is a diagram illustrating a computer system according to an embodiment of the present invention.

Referring to FIG. 11, the interaction apparatus 100 according to the embodiment of the present invention may each be implemented in a computer system 1100 such as a computer-readable storage medium. As illustrated in FIG. 11, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

The present invention may recognize turn-taking behavior for a natural conversation between a robot and a person, thus enabling an activity for interaction to be taken.

Further, the present invention may allow a robot to detect a person's intention and to recognize turn-taking behavior for natural interaction while the robot or the person is making an utterance.

Furthermore, the present invention may support the extension of a conversation model by recognizing turn-taking behavior between a robot and a person.

In addition, the present invention may be applied to a system, such as a chatbot, an artificial intelligence (AI) device, or an AI speaker, which is capable of interacting with a person.

As described above, in the interaction apparatus and method according to the present invention, the configurations and schemes in the above-described embodiments are not limitedly applied, and some or all of the above embodiments can be selectively combined and configured such that various modifications are possible.

What is claimed is:

1. An interaction apparatus, comprising:
an input unit for receiving multimodal information including an image and a voice of a target to allow the interaction apparatus to interact with the target;
a recognition unit for recognizing turn-taking behavior of the target using the multimodal information; and
an execution unit for taking an activity for interacting with the target based on results of recognition of the turn-taking behavior,
wherein the recognition unit recognizes, as the turn-taking behavior, any one of an action of the target intending to start an utterance and an action of the target intending to wait for the interaction apparatus to make an utterance using multimodal information about the target received while the interaction apparatus is making the utterance,
wherein the recognition unit recognizes the turn-taking behavior based on at least one of a lip shape, a lip state, and a gesture of the target received from the multimodal information,
wherein the recognition unit recognizes any one of the action of the target intending to start an utterance and the action of the target intending to wait for the interaction apparatus to make an utterance by detecting a state in which the lips of the target are open as the lip state of the target and by identifying a preset word from the lip shape, and
wherein the recognition unit sets a frequency with which the lips of the target are open and a time for which the lips of the target are open while the target is not making an utterance, as weights for detecting the lip state of the target.

2. The interaction apparatus of claim 1, wherein the recognition unit further recognizes the turn-taking behavior based on multimodal information about the target received while the target is making an utterance.

3. The interaction apparatus of claim 2, wherein the recognition unit allows the interaction apparatus to recognize four types of actions of the target based on the multimodal information, and recognizes any one of the four types of actions as the turn-taking behavior.

4. The interaction apparatus of claim 3, wherein the recognition unit recognizes, as the turn-taking behavior, any one of an action of the target intending to continue an utterance and an action of the target intending to stop an utterance using the multimodal information about the target received while the target is making the utterance.

5. The interaction apparatus of claim 1, wherein the recognition unit is configured to, when the gesture of the target recognized from the multimodal information is a negative gesture, recognize the gesture as the action of the target intending to start an utterance, and when the gesture of the target is an affirmative gesture, recognize the gesture as the action of the target intending to wait for the interaction apparatus to make an utterance.

6. The interaction apparatus of claim 5, wherein the recognition unit sets a higher weight for the negative gesture of the target than for the affirmative gesture of the target when setting weights for recognizing the gesture of the target, thus increasing a probability of recognizing the action of the target intending to start an utterance.

7. An interaction method for an interaction apparatus, comprising:
receiving multimodal information including an image and a voice of a target to allow the interaction apparatus to interact with the target;
recognizing turn-taking behavior of the target using the multimodal information; and
taking an activity for interacting with the target based on results of recognition of the turn-taking behavior,
wherein recognizing the turn-taking behavior comprises recognizing, as the turn-taking behavior, any one of an action of the target intending to start an utterance and an action of the target intending to wait for the interaction apparatus to make an utterance using multimodal information about the target received while the interaction apparatus is making the utterance;
recognizing the turn-taking behavior based on at least one of a lip shape, a lip state, and a gesture of the target received from the multimodal information; and
recognizing any one of the action of the target intending to start an utterance and the action of the target intending to wait for the interaction apparatus to make an utterance by detecting a state in which the lips of the target are open as the lip state of the target and by identifying a preset word from the lip shape, and
wherein recognizing the turn-taking behavior comprises using a frequency with which the lips of the target are open and a time for which the lips of the target are open while the target is not making an utterance, as weights for detecting the lip state of the target.

8. The interaction method of claim 7, wherein recognizing the turn-taking behavior further comprises recognizing the turn-taking behavior based on multimodal information about the target received while the target is making an utterance.

9. The interaction method of claim 8, wherein recognizing the turn-taking behavior further comprises allowing the interaction apparatus to recognize four types of actions of the target based on the multimodal information and to recognize any one of the four types of actions as the turn-taking behavior.

10. The interaction method of claim 9, wherein recognizing the turn-taking behavior further comprises recognizing, as the turn-taking behavior, any one of an action of the target intending to continue an utterance and an action of the target intending to stop an utterance using the multimodal information about the target received while the target is making the utterance.

11. The interaction method of claim 7, wherein recognizing the turn-taking behavior comprises, when the gesture of the target recognized from the multimodal information is a negative gesture, recognizing the gesture as the action of the target intending to start an utterance, and when the gesture of the target is an affirmative gesture, recognizing the gesture as the action of the target intending to wait for the interaction apparatus to make an utterance.

12. The interaction method of claim 11, wherein recognizing the turn-taking behavior comprises setting a higher weight for the negative gesture of the target than for the affirmative gesture of the target when setting weights for recognizing the gesture of the target, thus increasing a probability of recognizing the action of the target intending to start an utterance.

* * * * *